United States Patent [19]
Kubierschky

[11] Patent Number: 5,443,277
[45] Date of Patent: Aug. 22, 1995

[54] SPORTING DEVICE STEERABLE BY WEIGHT DISPLACEMENT AND A STEERABLE WHEEL ASSEMBLY FOR USE THEREIN

[76] Inventor: Stefan Kubierschky, c/o Freiherr Ferdinand von Liliencron Leopoldstr, 19, Munich D-8000, Germany

[21] Appl. No.: 133,146
[22] PCT Filed: Apr. 16, 1992
[86] PCT No.: PCT/EP92/00860
  § 371 Date: Oct. 15, 1993
  § 102(e) Date: Oct. 15, 1993
[87] PCT Pub. No.: WO93/16079
  PCT Pub. Date: Aug. 19, 1993

[30] Foreign Application Priority Data
  Apr. 18, 1991 [EP] European Pat. Off. ............ 91106231
  Oct. 7, 1991 [EP] European Pat. Off. ............ 91117063

[51] Int. Cl.6 .............................................. A63C 17/06
[52] U.S. Cl. ................................. 280/11.23; 280/11.28; 301/5.7
[58] Field of Search ............... 280/11.19, 11.22, 11.23, 280/11.25, 11.27, 11.28; 301/5.3, 5.7

[56] References Cited
U.S. PATENT DOCUMENTS

3,501,162 3/1970 Toone ...................... 280/11.23
4,132,425 1/1979 Lehner et al. ............ 280/11.23
4,403,784 9/1983 Gray ....................... 280/11.28
5,199,727 4/1993 Lai ......................... 280/11.28

Primary Examiner—Margaret A. Focarino
Assistant Examiner—Michael Mar
Attorney, Agent, or Firm—Townsend and Townsend Khourie and Crew

[57] ABSTRACT

A sporting device steerable by weight displacement, for example in the form of a roller skate or roller ski, comprises at least first and second wheels (10A, 10B) mounted on bearings for rotation about respective axles (46). The axles are mounted on a chassis (52) of the device, and spaced apart in the longitudinal direction of the device, with at least one of the wheels being steerable on displacement of the user's weight about an inclined steering axis (44) which intersects the ground substantially at the center (64A, 64B) of the contact patch of the respective wheel with the ground. The inclined steerable axis (44) extends downwardly and rearwardly for a front wheel (10A) and downwardly and forwardly for a rear wheel (10B). The steering axis is defined by a generally arcuate guide track (40; 42; 38; 87) provided within the inner race means (25). The guide track has a center of curvature which defines a virtual axis (44) that forms the steering axis and is disposed on either the inside or the outside of the inner race means (25). The associated axle (40) cooperates with the arcuate guide track to permit pivotal steering movement of the wheel (10) by relative movement between the guide track and the axle.

28 Claims, 4 Drawing Sheets

SPORTING DEVICE STEERABLE BY WEIGHT DISPLACEMENT AND A STEERABLE WHEEL ASSEMBLY FOR USE THEREIN

The present invention relates to a sporting device steerable by weight displacement as defined in the preamble of claim 1 and to a steerable wheel assembly suitable for use in such a sporting device as defined in the preamble of claim 13.

A sporting device and a steerable wheel element of this kind is known from international application PCT/EP89/00896 published under the number WO 90/01359.

The aforementioned application describes a variety of different chassis designs having either two, three or more wheels which are generally arranged in-line in the longitudinal direction of the sporting device. With a two wheel arrangement only one wheel needs to be steerable. In the case of a rear wheel the steering axis is inclined downwardly and forwardly and extends (when projected) through the contact patch of said wheel with the ground. In the case of a front wheel the steering axis is inclined downwardly and rearwardly through the contact patch of the wheel with the ground. With a three wheel device the center wheel would typically be fixed or, according to a proposal made for the first time herein, positioned with the steering axis disposed in a generally horizontal plane above or below the axis of rotation of the center wheel. The center wheel would be typically arranged between steerable front and rear wheels. Through this arrangement the center wheel can be constructed identically to the steerable front and rear wheels, but is however placed in such a way that movement of the center wheel about the steering axis does not primarily result in steering but simply assists in improving the handling characteristics of the sporting device.

It is also possible for the center wheel to be mounted so that it can slide in a generally horizontal direction generally perpendicular to the fore and aft longitudinal direction of the roller skate, preferably against a resilient restoring force tending to align the center wheel in the fore and aft direction of the roller skate. Such a resilient restoring force could for example be generated by resilient cushions of rubber or synthetic rubber placed on one or both sides of the wheel or by some other spring means of equivalent effect. It should be noted that it is also possible to provide more than three wheels, e.g. four or five wheels, in which case all "center wheels", i.e. wheels other than the front and rear wheels can be executed as described immediately above with the possibility of horizontal sliding transverse to the longitudinal direction of the skate. It is also entirely possible to provide the center wheels with inclined steering axes in the same way as for the front and/or rear wheels, Wheel assemblies of the kind described above with inclined steering axes are also disclosed in European patent application No. 90 120 928.8 and the present steerable wheel assemblies can also be used in chassis of that kind and indeed in a wide variety of other possible applications.

Generally speaking, the steerable wheel assemblies already proposed by the present applicant involve two roller bearings per wheel. There is however one embodiment of the aforementioned international application PCT/EP89/00896 which uses only a single bearing but then requires a bearing with a specially designed inner race to support gimbal pins which define the steering axis.

Since rolling element bearings are relatively expensive, and since it is certainly not necessary to use two bearings per wheel to carry the loads involved, there would be substantial benefit in a design which uses only a single roller element bearing per wheel and which enables a standard bearing to be used in place of a special bearing with a special inner race. It is therefore a first object of the present invention to provide such a design.

Furthermore, the existing designs, while very compact, essentially restrict the inclined steering axis to the space available within the inner race of the bearing. It is a further object of the present invention to provide a steerable wheel assembly and a sporting device incorporating such a steerable wheel assembly, where the steering axis may be optionally located within the inner race or outside of the inner race.

In order to satisfy these objects there is provided, in accordance with the present invention, a sporting device of the initially named kind but with the characterising features of claim 1 and a steerable wheel assembly of the initially named kind but with the characterising features of claim 13.

The use of an arcuate guide in place of gimbal pins or a short axle member to define the steering axis enables the steering axis to be realised as a virtual axis located at the center of curvature of the arcuate guide so that the wheel can execute steering movements about this steering axis. Since this steering axis is a virtual axis it can be disposed as desired either inside the inner race of the bearing or outside of the inner race of the bearing thus granting substantial design freedom. Moreover, this axis can be realised without requiring any special layout of the inner race of the bearing, so that the bearing arrangement can be reduced to a single roller element bearing of standard design with attendant cost and weight savings. The invention could however also be used with a bearing arrangement comprising a pair of roller element bearings as previously proposed. There may be situations which make this desirable, for example for sporting devices used in competitions where higher bearing and axle loadings are to be expected.

The arcuate guide is preferably defined inside a sleeve inserted within an inner race of the bearing. The sleeve is conveniently a two-part sleeve and is held together by the inner race of the bearing.

Preferred further developments of the invention are set forth in the subordinate claims. The invention will now be described in further detail by way of example only and with reference to the accompanying drawings in which:

Figures 1, 3:
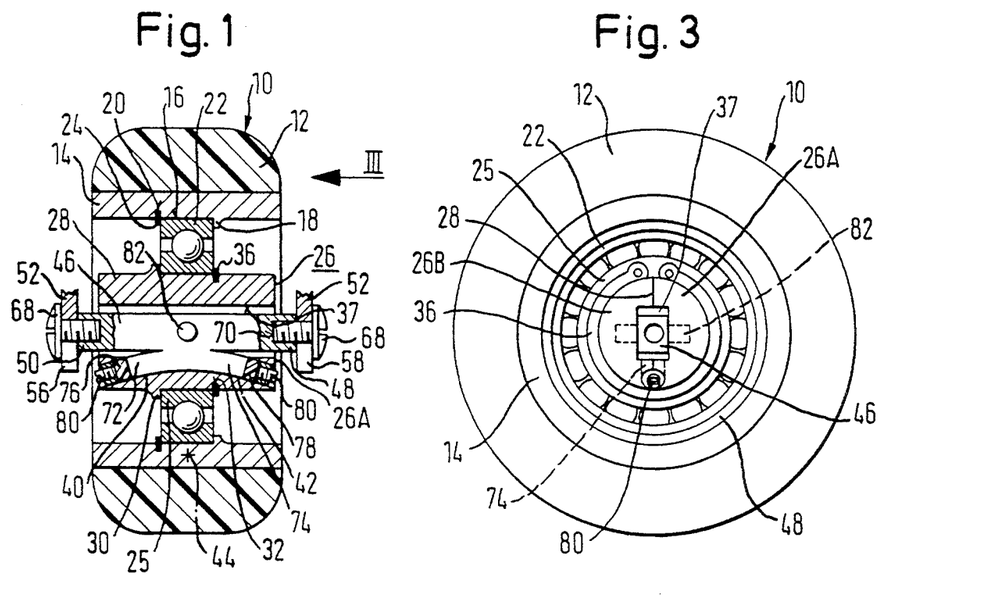
FIG. 1 is a horizontal cross-section through a steerable wheel assembly in accordance with the present invention.
FIG. 3 is a side view of the wheel assembly of FIG. 1, but with the rim, tyre and circlip omitted for clarity.

Turning first to FIGS. 1 and 3 there can be seen a wheel 10 comprising a tyre 12, preferably of polyurethane, adhesively mounted and/or mounted in form-locked manner on a wheel rim 14. The wheel rim 14 has a cylindrical or substantially cylindrical central ring surface 16 defined between an annular shoulder 18 and a circlip groove 20. The outer race of a single row rolling element ball bearing 22 is pressed into said cylindrical surface 16 against said shoulder 18 and is secured by a circlip 24 inserted in said circlip groove 20.

Within the inner race 25 of said bearing there is disposed a plastic sleeve 26 having two parts 26A and 26B of identical design as can be seen from FIG. 3. The two generally semi-cylindrical sleeve parts 26A and 26B meet at a parting surface which is in fact the surface 28 which can be seen in FIG. 1. The two parts of the sleeve 26 define an annular shoulder 30 and are provided with a circlip groove 32 in similar manner to the wheel rim 14. As can be seen from FIG. 1 the inner race 25 of said bearing 22 is pressed against said annular shoulder 30 and is secured by a circlip 36 introduced into said circlip groove 32.

In distinction to the embodiment shown in FIG. 1 the two circlips 24 and 36 can be extended radially to act as seals for the rolling element bearing. The inner race 25 of the bearing 22 also holds the two halves of the sleeve 26 together. Dowel and socket features may be provided in the two halves 26A, 26B to facilitate alignment and locking of these two pieces.

Within the sleeve there is a passage 37 of generally rectangular cross-section with flat upper and lower sides and this passage merges into two short arcuate branches 40 and 42 which are of square cross-section in this embodiment. The two arcuate branches or guide passages 42 and 40 have a common center of curvature 44 which in this embodiment lies in the rim 14 outside of the outer race of the bearing.

Figure 2:
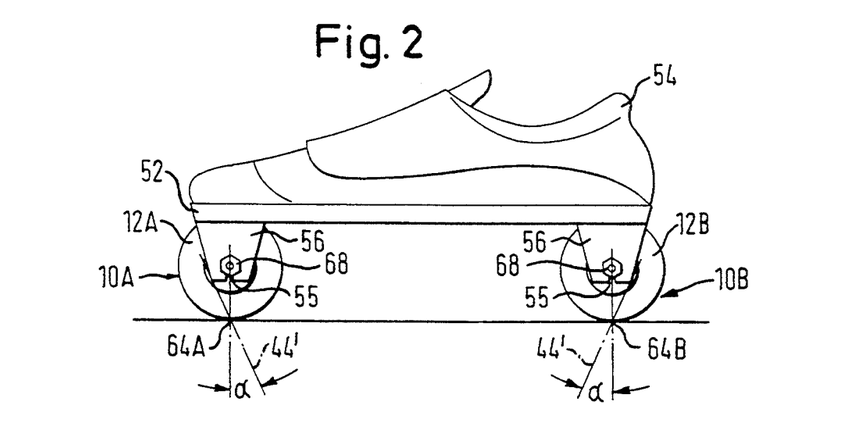
FIG. 2 is a side view of a sporting device in two-wheel form showing the use of a wheel assembly in accordance with FIG. 1 in such a device.

Within the passage 37 there is located the wheel axle 46 which is in this case rigidly mounted at its ends 48 and 50 to the chassis 52 of a roller skate as seen in FIG. 2. As shown in FIG. 3 this chassis may be integral with the sole of a skating boot or it may be a separate component fixed to the sole 54. In the specific embodiment shown here the axle is supported at its ends in posts 56 and 58 which are rigidly attached to said chassis 52. These posts could be replaced by pivoted arms in the manner of a leading or trailing arm suspension, which could also be a single leading or trailing link at only one side of the wheel, precisely as explained in the aforementioned PCT application PCT/EP89/00896.

At its ends the axle 46 has reduced diameter portions which have a generally circular cross-section but with two flattened sides and these flats locate on correspondingly provided flat sides of slots 55 in the bottom ends of said posts 56, 58 thus placing the wheel assembly in the chassis in the desired orientation. I.e. for the front wheel 12A in FIG. 2 such that the inclined axis 44 points rearwardly and downwardly through the ground contact patch portion 64. For the rear wheel 12B the wheel assembly is reversed so that the inclined steering axis 44 points downwardly and forwardly through the ground contact patch.

Bolts 68 extend into threaded recesses 70 in the ends of the axle and serve to secure the axle within the posts 56, 58. Suitable locking means are provided for the bolts, for example in the form of a split ring.

Formed on the axle 46 and integral therewith are two arcuate spigots 72 and 74 which project into the arcuate guide tracks 40 and 42 and are of the same cross-sectional shape thereas, but fractionally smaller, so that the arcuate spigots 74, 72 can slide in the respective arcuate tracks 40 and 42, whereby the axle as a whole can pivot relative to the remainder of the wheel assembly about the steering axis 44. It is noted that the arcuate tracks 40, 42 and the arcuate spigots 72, 74 locate the axle 46 relative to the sleeve in the fore and aft directions.

At the ends of the arcuate guide tracks 40, 42 there are provided resilient elastomeric cushions 76 and 78 which are retained by grub screws 80. The grub screws are of adjustable position and permit the degree of compression and thus resilience of the cushions to be adjusted in use. By differential adjustment of the grub screws, i.e. of the resilience of the cushions, it is also possible to pivot the wheel slightly about the steering axis 44 relative to the wheel axle 46 and this produces the same effect as the canting arrangements disclosed in German patent application P 40 13 018.5. Thus this design also permits adjustable canting with attendant benefits.

It is not essential for the resilient cushions for the resetting of the axle to be provided in the position shown. The resetting arrangement could readily be the same with this embodiment as with the steerable wheel assemblies shown in PCT application PCT/EP89/00896, i.e. could take the form of rubber cushions mounted in recesses in the sleeve with the rubber cushions cooperating with a pin extending through the center of the axle, for example as indicated at 82 in FIG. 1.

It will be noted from FIG. 3 that the flat upper and lower surfaces of the axle 46 slide on the flat upper and lower surfaces of the generally rectangular cross-section of the passage 37 within the sleeve, so that the axle which may e.g. be made of cast steel is largely relieved of bending stresses.

Figure 4:
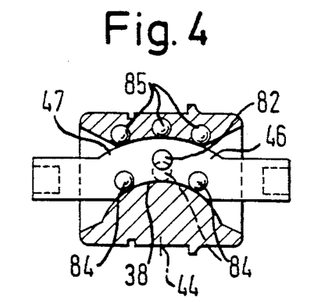
FIG. 4 is a horizontal cross-section through an alternative embodiment of the axle and guide sleeve of the wheel assembly of FIG. 1.

FIG. 4 shows an alternative embodiment in which the axle 46 has a center section with two arcuate sides 45, 47 having a common center of curvature 44 which again defines the steering axis. A corresponding arcuately-shaped recess 38 is provided within the two part sleeve 26 so that the axle 46 is a sliding fit within the sleeve 26. Again the upper and lower sides of the axle 46 bear on the upper and lower surfaces of the passages in the sleeve. However in this embodiment the surfaces need not be flat. For example, the arcuate section of the axle could be of round or elliptical cross-section as well as of rectangular, square or polygonal cross-section. The resetting force is generated here by the pin arrangement 82 discussed above.

As an option it should also be possible to incorporate balls or cylinders into pockets in the surface of one of both of the axle and guide track if desired. Such balls are shown in broken lines at 84 (in the axle) and at 85 (in the guide track).

In other respects the sleeve and axle are placed within the inner race of a bearing in a manner similar to that shown in FIG. 1.

Figure 5:
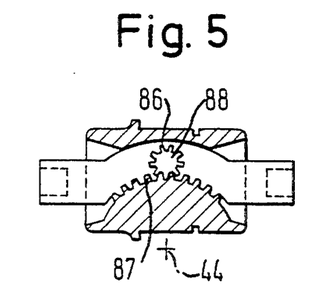
FIG. 5 is a further horizontal section through an axle and guide sleeve assembly of a further modification of the steerable wheel assembly of FIG. 1.

FIG. 5 shows another alternative embodiment in which the arcuate guide track is formed with a toothed track 87 at at least one surface with the teeth of the toothed track lying on a pitch circle having a center of curvature at 44. Mounted within the axle is a gearwheel 86 which is rotatable about a pin 88 with the teeth of the gearwheel 86 meshing with the teeth of the arcuate guide track. In this example the rear surface of the axle is again arcuate with a center of curvature at 44 and cooperates with a corresponding arcuate surface of the sleeve. The pin 88 can, if desired, be extended above and below the axle so that it also satisfies the function of the pin 82.

Although the tyres 12 of the wheel assembly of FIG. 1 are shown with a rounded ground contact surface they can have a flat surface or a grooved surface, or indeed even a concave surface as desired.

Turning now to FIGS. 6 to 11 there can be seen the preferred embodiment of the present invention. Parts having counter-parts in the previously described embodiments, or executing the same functions as the counter-parts in the previously described embodiments, have been characterised by the same reference numerals, so that a detailed description of these parts is not necessary.

Figure 6:
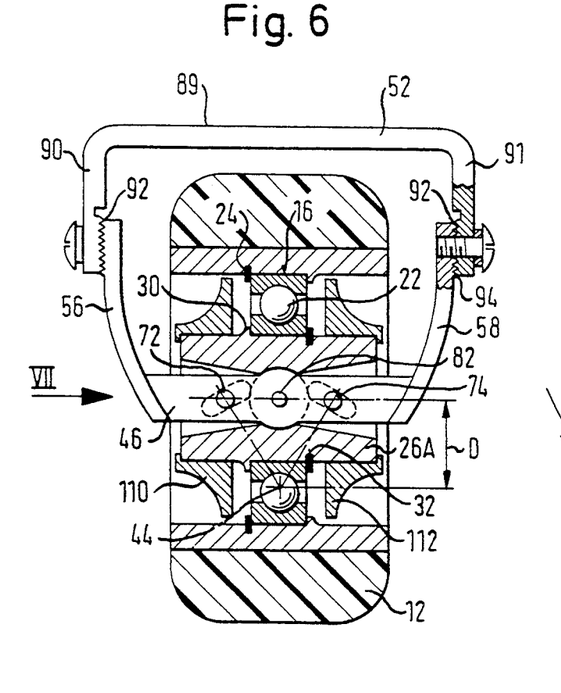
FIG. 6 is a cross-section through a particularly preferred embodiment of the invention as seen on the plane VI—VI of FIG. 7, the drawing being to the scale 1:1.

It will be seen from FIG. 6 that the chassis has generally an inverted U-shaped cross-section with a horizontal base portion 89 and two vertically downwardly directed side rails 90, 91. In a particularly preferred embodiment this chassis is formed as an extrusion and indeed comprises two such U-shaped rails one of which telescopes within the other. The telescope joint is provided essentially at the center between the front and rear wheels. This telescoped arrangement of the chassis is so contrived that different degrees of telescoping can be provided. In this way the chassis can be adapted to a variety of boot sizes, so that only one chassis need be made for a range of different boot sizes. This makes the chassis particularly economical to manufacture.

Figure 7:
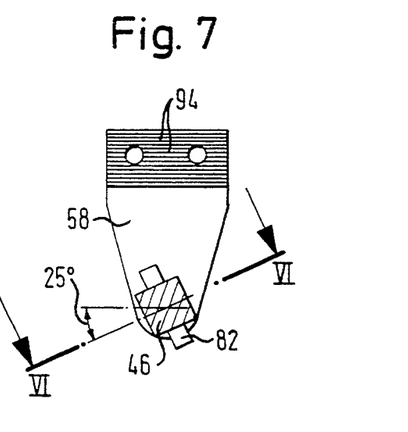
FIG. 7 is a partly sectioned side view of an axle with integral mounting lug as seen in the direction of the arrow VII of FIG. 6.

A further feature of a chassis in this design is the fact that the side rails can be provided at either their inside or outside surfaces, preferably at the inside surfaces, with serrations in the form of longitudinally extending teeth 92. These serrations can cooperate with corresponding serrations 94 provided on the outsides of the lugs 56 and 58 which are used to connect the axle 46 to the chassis. The inside of one of these lugs is shown in FIG. 7 and it can be seen that the lugs have two holes which accommodate fasteners used to fasten the lugs or posts 56, 58 to the side rails of the chassis. These fasteners can comprise threaded bolts, nuts and bolts, rivets or any other convenient fastener. The serrations 94 and 92 may be so contrived that the lugs 56, 58 can only be connected to the chassis in one specific position, they may alternatively be constructed in such a way that the lugs can be connected to the side rails of the chassis in a plurality of different vertical positions thus permitting a slight inclination of the axle 46 relative to the horizontal direction, i.e. so that the axle 46 is no longer parallel to the horizontal direction or to the top rail of the chassis 52. This arrangement represents another way of achieving the canting effect described in the international patent application PCT/EP91/00781.

Another special feature of the embodiment of FIGS. 6 to 11 is the fact that the lugs or posts 56, 58 are formed integrally with the axle shaft 46. In the present embodiment this is done by welding the metallic lugs 56, 58 to the ends of the axle shaft 46. For this purpose the axle shaft may conveniently be made of steel or of titanium. The axle shaft itself is of square cross-section as can be readily seen from the cross-section of FIG. 7. The lugs or posts 56, 58 need not necessarily be welded to the ends of the axle shaft 46, they could alternatively be formed integrally therewith, that is to say the axle plus lugs could be formed as a casting or as a forging or by any other appropriate techniques. Irrespective of how the lugs 56, 58 are integrally formed with the ends of the axle shaft 46 the arrangement is dimensioned in such a way that the preformed axle can be assembled with the sleeve portions 26A, 26B and the remainder of the wheel assembly.

This arrangement of the integral lugs 56, 58 at the ends of the axle shaft is particularly preferred since it avoids all the difficulties which can arise in securing the axle shaft at its ends to the support members of the chassis and can indeed be executed in such a way that the strength of the axle shaft is improved.

Another very important feature of the design of FIGS. 6 to 11 is the improved layout of the arcuate guide for the axle 46.

Figure 8:
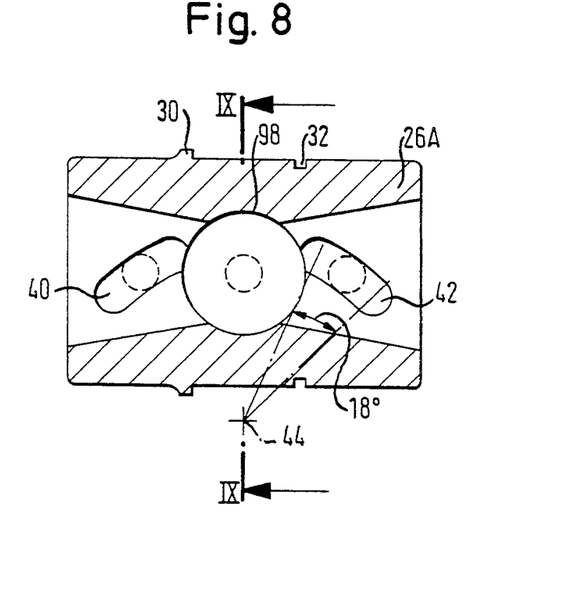
FIG. 8 is a plan view of the one half of the sleeve used in the wheel assembly of FIG. 6 but to an enlarged scale of 2:1.

As can be seen in particular from FIG. 8 the arcuate guide takes the form of two arcuate slots 42, 40 which are machined into each half of the two-part sleeve 26A, 26B. Only the part 26A is shown in the drawing, the part 26B is however identical thereto. At their inner ends these two arcuate slots 42, 40 merge into a cylindrical recess 98 which serves to accommodate a resilient cylindrical cushion in similar manner to the cylindrical cushion described in the above-mentioned international application No. PCT/EP89/00896.

As can be seen from FIG. 10 three pins 72, 82 and 74 extend through the center of the axle shaft 46 perpendicular thereto and project at both ends above and below the axle shaft, as can be seen from the pin 72 in FIG. 11. The central pin 82, which was previously described in relation to the embodiment of FIG. 1, and which can also be seen in FIG. 6, extends into the cylindrical recess 98, into a resilient cushion interposed in the cylindrical recess 98, and serves to center the wheel in the longitudinal fore and aft direction of the skate. The two other pins 72 and 74 project at each of their ends into the arcuate guides 40 and 42 in the two halves 26A and 26B of the sleeve, they are a sliding fit in these arcuate guides and ensure that the axle rotates about the center of curvature of the arcuate guide slots, which have a common center of curvature 44, i.e. which lie on a common arc.

At this juncture it should be explained that FIG. 6 is not a true vertical section through the wheel, instead the wheel and center portion of the axle have been turned clockwise through 115° relative to FIG. 7 so that the details of the assembly are easily seen. The correct alignment of the center of the axle and the sleeve assembly can be readily seen from FIG. 7 which shows the alignment of the center pin 82.

Figure 10:
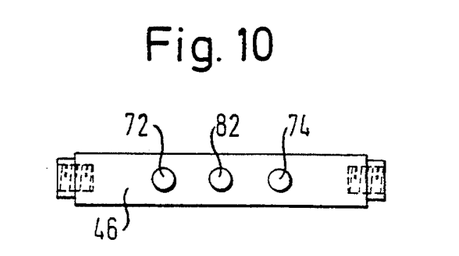
FIG. 10 shows a plan view of the axle incorporated in the wheel assembly of FIG. 8 to an enlarged scale (2:1), and prior to welding on of the lugs.
Figure 11:
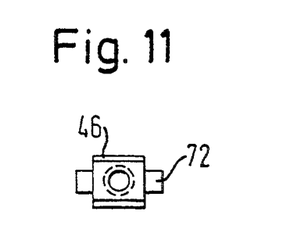
FIG. 11 shows the axle of FIG. 10 in side view in the direction of the arrow XI of FIG. 10.

It should also be pointed out that the axle ends shown in FIG. 10 have been shown as if they were for use with the chassis of FIG. 2 and can also be thought of as having the form used prior to welding on of the lugs. In fact it is not necessary to provide such a detailed shape of the axle ends prior to welding on of the lugs, thus saving substantial machine work.

It can be seen from FIG. 6 and also from FIG. 8, that the two halves 26A, 26B of the sleeve have a recess therein which is generally of hour glass shape in plan view. It can be thought of as being formed by two narrow isoceles triangles the apices of which merge into one another. The purpose of this shape is to provide sufficient freedom of movement between the sleeve and the axle 46 during steering of the wheel. As can be seen from FIG. 8 the extent of this movement amounts to 9° to either side, i.e. to a total of 18° of steering movement.

At this stage it should also be pointed out that it is particularly beneficial for the arcuate slots 40 and 42 to merge fully into the cylindrical recess for the resilient cushion. In this way, during extreme steering movement, the respective pin 72, 74 nearest to the resilient cushion can exert a further compressive force on the cushion thus modifying the effect thereof.

Figure 9:
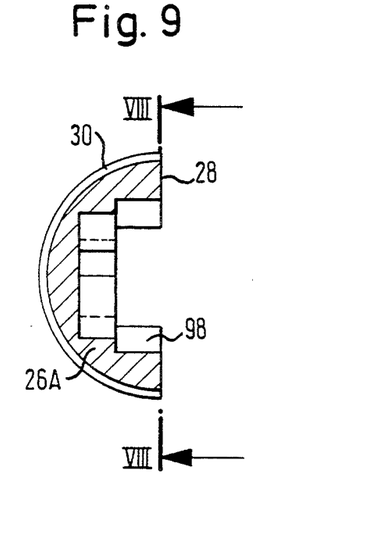
FIG. 9 is a section on the plane XI—XI of FIG. 8.

It will be noted, in particular from FIG. 9, that the base of the recess in each of the two halves 26A, 26B of the sleeves is flat and these flat surfaces cooperate with the essentially flat corresponding surfaces of the axle 46, so that there is a good bearing area. The surfaces of the axle 46 and of the pin 72, 74 can if necessary be coated with a friction reducing coating, for example of PTFE.

It will be noted that with the single bearing arrangement the two ends of the split sleeve 26A, 26B project at the left and right sides beyond the inner race of the bearing. In order to prevent any tendency for the two halves of the sleeve to separate outside of the bearing two retaining collars 110, 112 are provided which are pushed onto the two ends of the sleeve. The retaining collars may be provided with an internal thread so that they can be screwed onto the sleeve and indeed the arrangement can be such that the retaining collars cut their own thread in the sleeve. The retaining collars can be extended radially as shown in FIG. 6 to provide the effect of a hub cap and to better seal the space containing the bearing. The bores in the retaining collars could also be tapered and mate with tapered ends of the sleeve. Such tapered ends can facilitate entry of the sleeve through the inner race of the bearing if dimensional constraints are tight.

The sleeve is preferably made in a technical plastic such as Delrin, Arnite or Hostaform (registered trade marks). The axle can be made in steel or titanium (for example) and the retaining collars are preferably made in a lightweight material such as magnesium or aluminium.

Figure 12:
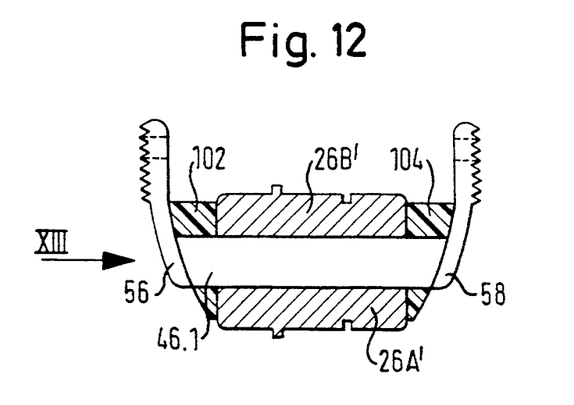
FIG. 12 shows a modified version of the sleeve of FIG. 8 for use with a non-steered center wheel and also shows the axle arrangement used therewith.
Figure 13:
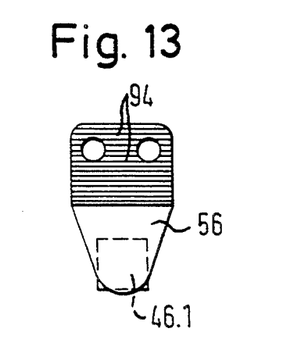
FIG. 13 shows a view of the mounting lug integral with the axle of FIG. 12 as seen in the direction of the arrow XIII of FIG. 12.

FIGS. 12 and 13 show an axle arrangement for a non-steered center wheel. Here the axle 46.1 is mounted via two integral lugs or posts 56, 58 to the chassis in the same way as previously described. The serrations 94 on the lug 56 can be readily seen from FIG. 13. Moreover it will be noted from FIG. 13 that in this embodiment the square section of the axle shaft 46.1 is horizontally aligned.

On the square section of the axle shaft 46.1 there is again mounted a two-part sleeve 26A', 26B' which in this case also comprises two identical halves but with a throughgoing central axial aperture of constant square cross-section corresponding to the cross-section of the square portion of the axle 46.1. Thus the two sleeve portions 26A' and 26B' are free to slide in the axial direction along the square section portion of the axle shaft 46.1. It will be understood that the wheel is mounted on the sleeve 26A', 26B' in the same way as the wheel 12 is mounted on the sleeve 26A, 26B of the FIGS. 1 and 6 embodiments.

Interposed between the sleeve and the posts are two preshaped resilient rubber cushions 102 and 104 which permit axial sliding of the wheel and sleeve along the square section portion of the axle shaft 46.1 but also produce a self-centering movement of the latter.

Figure 14:
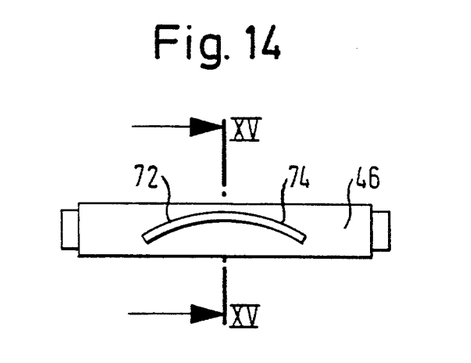
FIG. 14 shows a plan view of an alternative axle design.
Figure 15:
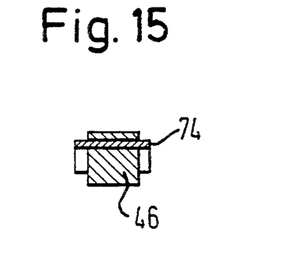
FIG. 15 shows a cross-section through the axle of FIG. 14 on the plane XV—XV.

FIGS. 14 and 15 show a variant of the embodiment of FIGS. 6 to 11. In this embodiment the two pins 72 and 74 are replaced by a segment of a cylinder which projects at both ends beyond the upper and lower surfaces of the square section axle 46. As shown in FIG. 15 the cylindrical segment is in this embodiment an actual segment of a cylinder, e.g. of a steel tube, which is inserted into an arcuate slot in the axle 46 and may for example be fixed in place by brazing or by cross-pinning (not shown). It is however entirely possible to manufacture the axle from a solid by machining, or indeed to shape it by a forging or casting process. It will be understood that the cylindrical segment projection 72, 74 of the FIG. 14 and 15 embodiment provides a greater bearing surface in the arcuate slots than the cylindrical pins 72 and 74 and this may be of advantage if the arcuate slots should tend to wear too rapidly.

Although not shown in this embodiment a central pin 82 could again be used with resilient cushions to provide resetting of the wheel to the straightahead position, alternatively a different embodiment could be used, for example with resilient cushions provided at the ends of the sleeve to achieve self-centering.

It should be noted that with an embodiment in which the wheel assemblies are mounted on leading or trailing links (not shown) the lugs 56, 58 can take the form of the respective links and can again be formed integral with the axle shaft 46.

Figure 16:
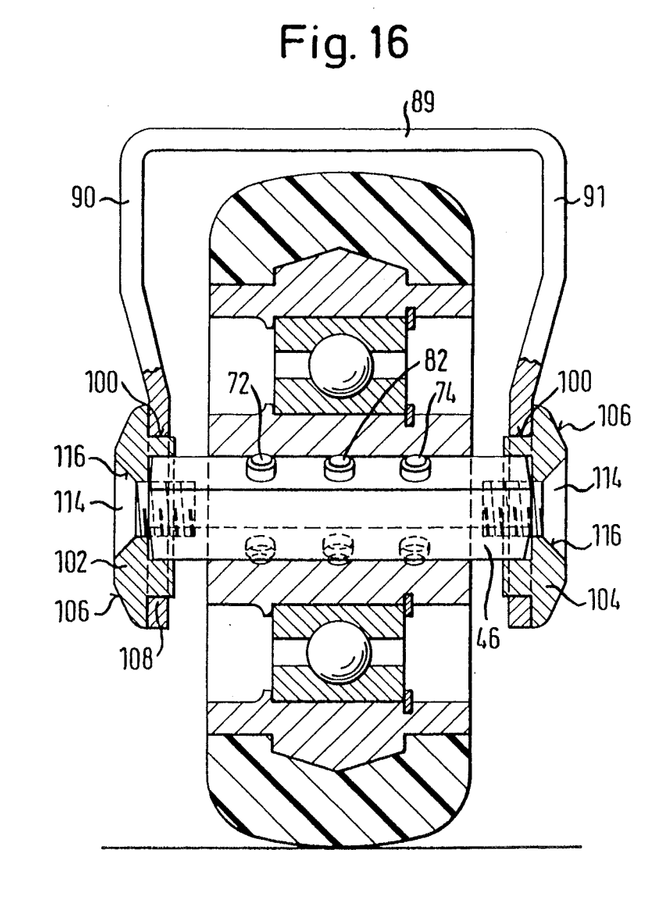
FIGS. 16 and 17 show the preferred way of mounting an axle approximately in accordance with FIG. 10 in a chassis with FIG. 16 being a schematic cross-section through the claims perpendicular to its longitudinal axis and FIG. 17 being a side view of FIG. 16 in the direction of arrow XVII.
Figure 17:
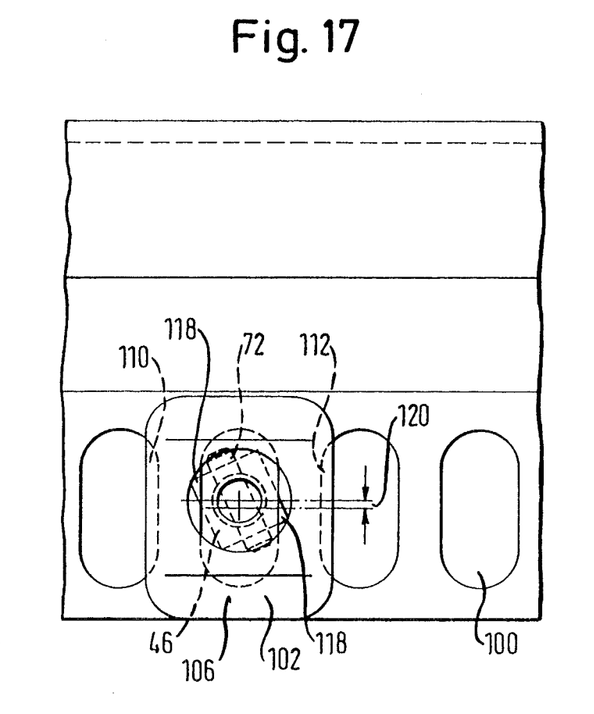

FIGS. 16 and 17 show the preferred way of mounting a wheel and axle assembly in accordance with the present invention in a chassis. Again the chassis has a horizontal base portion 89 and two vertically downwardly directed side rails 90 and 91, the lower portions of which are offset inwardly towards the central longitudinal axis of the skate by a small amount. The notable feature of this axle mounting arrangement is the elongate rounded slot-like openings 100 which are present in both of the inwardly offset portions of the side rail 90 and 91. The axle 46 of this embodiment, which closely resembles the axle 46 of the FIG. 10 and 11 embodiment is mounted at its two ends in inserts 102, 104 which are inserted into the elongate slot-like apertures 100 in the side rails. The inserts can for example be formed in a metal or a technical plastic. It will be noted that they each have a head portion 106 which sits against the outer surface of the respective side rail and a spigot portion 108 which fits into the respective opening 100 in the side rail. At their inner sides the inserts 102, 104 each have a generally squared recess which accommodates the respective square section end of the axle 46. In this way the orientation of the axis 46 is accurately determined so that the notional steering axis has the desired angular position as recited earlier in this specification. If desired the inserts can also be provided with lugs 110, 112 at the two sides which fit into neighbouring ones of the equally spaced apertures 100 to further locate the inserts 102, 104. The axle is retained in the chassis and in the inserts via counter-sunk screws 114 which fit through the insert into screw threads provided in the ends of the axle 46. The counter-sunk heads of the screws 114 are received in respective counter-sunk recesses 116 of the inserts.

The corners 118 of the axle shown in hatched lines in FIG. 17 are preferably removed to permit the axle to extend through the openings 100 in the side rails of the chassis into the inserts. The flat surfaces which result provide additional location.

The above described arrangement has several benefits. First of all the inserts can be made so that the recess for the axle end and the screw are slightly asymmetrically positioned as indicated by the distance 120 and so that they are reversible in the vertical direction, i.e. can be fitted either one way up or the other way up. In this way it is possible to achieve the canting effect described earlier in the specification. Moreover, different cantings can be achieved with different inserts and it is in each case only necessary to produce one design of insert which can be used as desired on either side of the chassis. Secondly the ability to use a square section bar as the axle greatly simplifies the design of the axle and its manufacturing cost. Adequate space is available for the insertion of the wheel and axle assembly into the chassis because the inserts are fitted after the axle has been roughly positioned in a pair of opposing slots 100 on opposite sides of the chassis. Furthermore, the ability to offset the bottom ends of the side rails inwardly means effectively that the chassis is broader at the top end and this allows for a greater angle of deflection of the wheel (25° not shown in FIG. 16). Moreover, by producing a chassis with a whole row of equispaced holes 100 the wheels can be positioned at any desired position along the chassis and indeed combinations of two, three or more wheels can be used in a particular chassis as desired.

Two further possible embodiments should be mentioned here.

Although it is preferred to use one ball bearing per wheel for cost reasons the design of the present application could nevertheless be realised using two ball bearings as previously. That is to say the design concept here would be fully consistent with a two ball bearing per wheel skate which could possibly be of advantage for example with a very heavy skater or, if it is desired, to build in a certain degree of speed restriction for the skates. It has namely been found that two ball bearings per wheel cause a certain degree of frictional braking.

The other embodiment which is of particular interest to racers is the ability to shorten the arcuate guide for the axle or indeed to make this guide asymmetric to one side. This would then mean that the steering angle in one direction would be smaller than in the other. It could for example be achieved by shortening one of the arcuate guides 40, 42 of FIG. 8 at the outside end to restrict the steering angle. A similar modification could be made in the example of FIG. 1. A shortening of the arcuate tracks of this kind, which could also be achieved by inserts, would have a special advantage for racers who race around closed tracks and predominantly run in one direction thus needing greater steering in one direction than in the other.

I claim:

1. Sporting device steerable by weight displacement, for example in the form of a roller skate or roller ski, comprises at least first and second wheels (12A, 12B) mounted on bearing arrangements (22, 25) for rotation about respective axles (46), said axles being mounted on a chassis of the device, and spaced apart in the longitudinal direction of said device, with at least one of the wheels being steerable on displacement of the user's weight about an inclined steering axis (44) which intersects the ground substantially at the center of the contact portion (64A, 64B) of the respective wheel (12A, 12B) with the ground (65), said inclined steerable axis extending downwardly and rearwardly for a front wheel (12A) and downwardly and forwardly for a rear wheel (12B), said steering axis being defined by a pivot means cooperating with the associated wheel axle (46) and disposed substantially within inner race means (25) of the associated bearing arrangement (22, 25) disposed within said wheel (14, 12), characterised in that said pivot means comprises a generally arcuate guide track (40, 42; 38, 87) located generally within said inner race means, said guide track having a center of curvature defining a virtual axis (44) forming said steering axis (44) with said steering axis being on one of an inside and an outside location relative to said inner race means (25), and the associated axle (46) having means (72, 74; 47; 86) cooperating with said arcuate guide track to permit pivotal steering movement of said wheel (12A, 12B) by relative movement between said arcuate guide track and said axle.

2. A sporting device in accordance with claim 1, characterised in that said arcuate guide track (40, 42; 38, 87) is defined inside a sleeve (26) inserted within an inner race (25) of said bearing arrangement.

3. Sporting device in accordance with claim 1, wherein the bearing arrangement in respect of each said wheel comprises a single rolling element bearing (22, 25), for example a ball bearing.

4. Sporting device in accordance with claim 2, characterised in that said sleeve (26) is a two-piece sleeve (26A, 26B), said two pieces of said sleeve preferably being of substantially identical shape and especially being held together by said inner race (25) of said bearing.

5. Sporting device in accordance with claim 1, wherein said means cooperating with said arcuate guide track (40, 42; 38) comprises an arcuate member (70, 72; 47) forming part of said axle (46).

6. Sporting device in accordance with claim 1, characterised in that said means cooperating with said arcuate guide track (40, 42) comprises two arcuate spigots (72, 74) of either circular, square or polygonal cross-section, said arcuate spigots projecting from said axle (46) and engaging within arcuate guide recesses (40, 42) of corresponding cross-sectional shape, said recesses forming said arcuate guide track.

7. Sporting device in accordance with claim 1, characterised in that said arcuate guide track comprises a toothed gear track (87) and meshes with at least one toothed gear (86) pivotally mounted (88) on or within said axle (46).

8. Sporting device in accordance with claim 2, wherein said sleeve (26) has a shoulder (30) forming an abutment for said inner race of said bearing arrangement and a groove (32) spaced from said shoulder (30) for receiving a circlip (36) for securing said bearing on said sleeve between itself and said shoulder, said circlip preferably forming a dust seal for one side of said bearing arrangement, for example by extending up to outer race means (22) of said bearing arrangement or up to a shoulder (18) retaining said outer race means.

9. Sporting device in accordance with claim 8, characterised in that said outer race (22) of said bearing arrangement is mounted in a rim (14) of the associated wheel via a corresponding shoulder (18) and circlip (24) arrangement on opposite sides of the bearing from the shoulder (30) and circlip (36) associated with said inner race (25), said corresponding circlip (24) preferably sealing the other side of said bearing arrangement (22, 25), for example by extending up to the inner race means (25) of said bearing arrangement or up to the first said shoulder (30).

10. Sporting device in accordance with claim 6, wherein resilient cushions (76, 78) are provided in said arcuate guide tracks (40, 42) at the ends confronting the ends of said spigots (72, 74) and wherein means are preferably provided for adjusting the resilience of said cushions, for example in the form of screw adjusters (80) screwed into said sleeve at said ends of said guide tracks.

11. Sporting device in accordance with claim 1, wherein said axle has flats at its upper and lower surfaces, cooperating with corresponding flat inner surfaces within said inner race means, for example within said sleeve (26).

12. Sporting device in accordance with claim 2, characterised in that said sleeve (26) comprises a plastic element.

13. A steerable wheel assembly, in particular for use in the sporting device in accordance with claim 1, said steerable wheel assembly comprising a wheel (10), a bearing (22, 25) disposed within said wheel and having inner and outer races (25, 22), a sleeve (26A, 26B) disposed within said inner race and an axle (46) disposed within said sleeve (26), said wheel (10) being rotatable about said inner race (25) of said bearing and steerable about an inclined steering axis (44) which, when the wheel is mounted in the chassis (52), extends in an inclined position in a substantially vertical plane and is directed substantially through the ground contact patch (64A, 64B) between said wheel and the ground, optionally fractionally in front of or behind the center of said contact patch (for wear compensation) or to either side of the center of said ground contact patch (for canting), characterised in that said steering axis is a virtual axis (44) defined by cooperation between said sleeve (26) and means (72, 74; 47; 86) mounted on or integral with said axle (46).

14. A steerable wheel assembly in accordance with claim 13, characterised in that said sleeve (26) defines an arcuate guide track (40, 42; 38; 87) extending only over a fraction of a circumference of a circle, the center of curvature (44) of said guide track defining said steering axis which is disposed, i.e. extends either inside or outside of said inner race (25).

15. A steerable wheel assembly in accordance with claim 14, characterised in that said sleeve comprises upper and lower portions which are preferably of identical shape (26A, 26B), with said arcuate guide track (40, 42) being provided in at least one of said portions and extending to the left and right sides of said bearing (22), and in that at least one projection (72, 74) is provided on said axle (46) and is adapted to slide along said arcuate track.

16. A steerable wheel assembly in accordance with claim 15, wherein said at least one projection comprises first and second pins (72, 74) which extend through said axle into portions (40, 42) of said arcuate guide track at the left and right sides of said bearing (22).

17. A steerable wheel assembly in accordance with claim 16, characterised in that said pins (72, 74) extend through two opposite sides of said axle (46), project beyond the side surfaces thereof and extend into respective arcuate guide tracks (40, 42) provided in each of said sleeve portions (26A, 26B).

18. A steerable wheel assembly in accordance with claim 15, characterised in that a pin member (82) extends through said axle (46) and cooperates with a resilient cushion disposed in a respective recess (98) in said sleeve (26A, 26B) for resilient centering of said wheel, said sleeve preferably being formed in first and second portions (26A, 26B) with said pin member (82) projecting from both sides of said axle and engaging with resilient cushions provided in respective recesses (98) in each of said portions.

19. A steerable wheel element in accordance with claim 18, characterised in that said arcuate guide track (40, 42) merges at the left and right sides of the bearing into said recess (98) or recesses of said sleeve or sleeve portions (26A, 26B).

20. A steerable wheel assembly in accordance with claim 15, characterised in that said projection comprises an arcuate projection, e.g. in the shape of a segment of a cylinder (72, 74), having a curvature corresponding to the curvature of said arcuate guide track.

21. A steerable wheel assembly in accordance with claim 14, characterised in that retaining collars (110, 112) are fitted over the ends of said sleeve projecting to the left and right sides of said bearing (22) and are optionally formed as hub caps or dust excluders.

22. A steerable wheel assembly in accordance with claim 21, characterised in that the retaining collars (110, 112) have a female thread, which can be threaded onto said projecting ends of said sleeve, said retaining collars optionally cutting the male thread on said sleeves during fittment.

23. A steerable wheel assembly in accordance with claim 14, characterised in that said axle (46) is of rectangular and preferably square cross-section and contacts at its upper and lower sides, which are inclined in accordance with the inclined angle of said steering axis the bases of recesses formed in said sleeve portions, said recesses preferably having when viewed in plan view a shape corresponding to two triangles which merge into one another at their confronting apices leading to a waisted hourglass shape.

24. A steerable wheel assembly in accordance with claim 14, characterised in that said sleeve consists of a technical high strength plastic, e.g. Deldin, Arnite or Hostaform (all registered trademarks) in that said axle consists of metal, in particular of a steel or titanium bar and/or in that said retaining collars consist of either a lightweight metal or metal alloy of aluminium or magnesium or of a technical plastic.

25. A steerable wheel assembly in accordance with claim 14, wherein said axle (46) is provided at its ends with integral lugs (56, 58) for attachment to a chassis.

26. A steerable wheel assembly in accordance with claim 25, wherein said lugs (56, 58) are welded or formed integrally with said axle (46), e.g. by forging or precision casting and are dimensioned and shaped so that said sleeve portions can be fitted around said axle and the axle and lugs passed through the inner race of the bearing (22) either prior to or after fittment of said sleeve (26A, 26B).

27. A steerable wheel assembly in accordance with claim 1 wherein said axle is coated at least on the surfaces which slide in said sleeve, with a friction reducing medium such as polytetrafluoroethylene (P.T.F.E.).

28. Wheel assembly in accordance with claim 13, characterised in that lugs provided at the ends of said axle for fitting said axle to a chassis are provided with a serrated (94) surface for engagement with counter-serrations (92) on said chassis (52), said serrations and said counter-serrations being preferably elongate and generally horizontally aligned and configured to permit mutual connection of said lugs to said chassis in either one position or in a plurality of different positions.

* * * * *